US006629250B2

(12) United States Patent
Kopser et al.

(10) Patent No.: US 6,629,250 B2
(45) Date of Patent: Sep. 30, 2003

(54) ADJUSTABLE DATA DELAY USING PROGRAMMABLE CLOCK SHIFT

(75) Inventors: Andrew S. Kopser, Seattle, WA (US); Burton J. Smith, Seattle, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/298,323

(22) Filed: Apr. 23, 1999

(65) Prior Publication Data

US 2002/0069374 A1 Jun. 6, 2002

(51) Int. Cl.[7] .................................................. G06F 1/04
(52) U.S. Cl. ........................................ 713/401; 713/503
(58) Field of Search ................................ 713/400, 401, 713/503, 500, 600

(56) References Cited

U.S. PATENT DOCUMENTS

| | | | | | |
|---|---|---|---|---|---|
| 4,584,695 A | * | 4/1986 | Wong et al. | ................... | 375/81 |
| 4,821,297 A | * | 4/1989 | Bergmann et al. | .......... | 375/376 |
| 4,943,984 A | * | 7/1990 | Pechanek et al. | ............ | 375/358 |
| 4,965,884 A | * | 10/1990 | Okura et al. | ................. | 375/354 |
| 5,615,358 A | * | 3/1997 | Vogley | ......................... | 713/501 |
| 5,670,904 A | | 9/1997 | Moloney et al. | ............. | 327/277 |
| 5,778,214 A | * | 7/1998 | Taya et al. | ................... | 713/400 |
| 5,926,838 A | * | 7/1999 | Jeddeloh | ...................... | 711/167 |
| 5,987,619 A | * | 11/1999 | Hamamoto et al. | ......... | 713/401 |
| 6,128,748 A | * | 10/2000 | MacWilliams et al. | ..... | 713/401 |

OTHER PUBLICATIONS

Gail Alverson et al., "Tera Hardware–Software Corporation", in *Proceedings of Supercomputing*, Nov. 1997.
Gail Alverson et al., "Scheduling on the Tera MTA" in *Job Scheduling Strategies for Parallel Processing, 949:of Lecture Notes in Computer Science*, Springer–Verlag, 1995.
Robert Alverson et al., "The Tera Computer System", in *Proceedings of 1990 ACM International Conference on Supercomputing*, pp. 1–6, Jun. 1990.
D.H. Bailey et al., "The NAS Parallel Benchmarks—Summary and Preliminary Results", in *Proceeding of Supercomputing '91*, pp. 158–165, Nov. 1991.
David Callahan, Recognizing and Parallelizing Bounded Recurrences, in *Languages and Compilers for Parallel Computing, 589:of Lecture Notes in Computer Science*, pp. 169–185, Springer–Verlag, 1992.
David Callahan et al., "Improving Register Allocation for Subscripted Variables", in *Proceedings of the ACM SIGPLAN '90 Conference on Programming Language Design and Implementation, SIGPLAN Notices*, 25(6):53–65, Jun. 1990.
David Callahan and Burton Smith, "A Future–based Parallel Language For a General–purpose Highly–parallel Computer", in *Languages and Compilers for Parallel Computing*, pp. 95–113, 1990.
Mark Linton, "The Evolution of Dbx", in *USENIX Summer Conference*, 1990.
Roy F. Touzeau, "A Fortran Compiler for the FPS–164 Scientific Computer", in *Proceedings of the ACM SIGPLAN '84 Symposium on Compiler Construction, SIGPLAN Notices* 19(6):48–57. Jun. 1984.

* cited by examiner

*Primary Examiner*—Dennis M. Butler
(74) *Attorney, Agent, or Firm*—Seed IP Law Group PLLC

(57) ABSTRACT

A circuit for electronically matching and synchronizing the receipt of data on transmission lines between two circuits. Data is transmitted from a sending circuit to a receiving circuit on transmission lines between the two circuits. A system clock is also provided to the receiving circuit to synchronize the receipt of data relative to the circuits on the chip. A variable delay circuit selectively provides the number of delayed clock cycles for the data. In one mode of operation, there is no delay in the clock cycles and the data is provided as an output on the subsequent system clock pulse after receipt by the receiving circuit. Under other conditions in a different mode, a delay is introduced in the data on the transmission line so that it is output to the receiving circuit one clock cycle delay from when it is received by the input terminal to the receiving circuit. The amount of delay is controlled by software that is programmable under user control.

17 Claims, 2 Drawing Sheets

ADJUSTABLE DATA DELAY USING PROGRAMMABLE CLOCK SHIFT

TECHNICAL FIELD

This invention is in the field of data transmission circuits and more particularly is directed towards a data transmission circuit that ensures accurate timing of transmitted signals on transmission lines having different lengths and propagation speeds.

BACKGROUND OF THE INVENTION

Data is transferred from one circuit to another on a transmission line. The length of the transmission line is often determined by the distance between the two circuits. The time between when the data is sent by the first circuit until the data is received by the second circuit is largely a function of the length of the transmission line.

If the clock speed of the system is increased, the real time required for data to travel on a transmission line does not charge, but the relative time changes. A data signal that formerly traveled down a transmission line in two clock cycles will now require three clock cycles if the clock speed is increased by about 30%. In the prior art, one solution is to never change the clock speed of the system. However, this limits system modification and performance enhancement at a later time. It also makes it difficult to test the system at different clock speeds.

It is also often desirable to ensure that the relative timing between many signals traveling on different transmission lines is kept the same when the data is transmitted from one circuit to a second circuit. If all transmission lines are the same length, or nearly the same length as each other, then maintaining the same relative timing is quite easy. However, there are a number of applications in which the difference in length between the transmission lines are sufficiently great that a timing skew occurs between data sent on two different transmission lines having different lengths from each other. If this timing skew becomes sufficiently great, the reliability of the data on the first transmission lines relative to each other can no longer be assured, and subsequent problems may result.

One current solution to avoid the skew when transmitting data from one circuit to the other is to ensure that all data transmission lines have approximately the same length as each other. Accordingly, when one line is significantly shorter than other lines, its length is increased by routing it in a different pattern between the two circuits It may, for example, undergo a number of bends and turns, some of them being 90 degree turns tightly positioned one after the other in order to achieve the desired length. Such a solution has the disadvantage of requiring that all transmission lines be the same physical length as the longest transmission line. All data transmission therefore is slowed based on the slowest possible communication link between the two circuits. This also has the disadvantage of consuming significant area between the two circuits. If the circuits are on an integrated chip, adding length to the transmission lines will consume already precious chip area. It may also add undesired capacitance or, in some cases, inductance, to the lines depending upon the layout and shape of the delay patterns.

SUMMARY OF THE INVENTION

According to principles of the present invention, a circuit is provided for permitting the clock speed of a system to be changed by a large amount and still ensure accurate operation of the whole system. The circuit also provides for electronically matching and synchronizing the receipt of data on transmission lines of various lengths between two circuits.

A sending circuit and a receiving circuit are connected to each other to exchange signals. A transmission line between the sending circuit and the receiving circuit carries signals in the form of data. The receiving circuit includes a master latch which receives the data sent on the transmission line. The timing for control of the output of the master latch is controlled by a first clock signal. A slave latch receives the output from the master latch. The timing of the output from the slave latch is controlled by a second clock signal which is different from the first clock signal. A variable delay circuit is connected to the clock signal for the master latch. The variable delay circuit includes a plurality of delay elements. A selected number of delay elements are positioned in the path of the clock for the master latch. The number of delay elements selected is under software control so that the delay is programmable. Different delays may be programmed depending on the clock frequency, the transmission line length, the speed at which the data is being sent, the types of circuits or other factors.

According to one embodiment, the software is scanned into a select register for storage when the circuit is initialized. The output of the select register controls a multiplexer for selecting one line output from a number of inputs. A number of delay lines, each having different amounts of delay are coupled as inputs to the multiplexer. That delay line providing the appropriate delay is selected as the output for delaying the clock to the master latch.

The clocks of the master latch and the slave latch for each transmission line or each set of transmission lines are controlled to ensure that the data output of the slave latch is always synchronized with the data output from the slave latch on other transmission lines between the two circuits. The amount of delay is programmable on each transmission line in the receiving circuit. Therefore, the timing for receiving the data at each of the input terminals of the second circuit can be controlled to ensure they have the same relation to each other as they had when the sending circuit transmitted the data.

Having the amount of delay software programmable provides the further advantage that the amount of delay can be easily customized in the receiving circuit after the transmission lines are created and can be changed whenever desired. It may be desired at various times to change the amount of delay on the transmission lines even though their length relative to one another remains the same. For example, the clock frequency may be increased, or each transmission line may behave differently when data is transmitted at a slow rate, such as 50 megahertz, as compared to when data is transmitted at a fast rate, such as 500 megahertz or higher. Accordingly, according to the present invention, the relative delay on one set of transmission lines or between the transmission lines can be reprogrammed based on the different transmission frequencies or any other factor.

DETAILED DESCRIPTION OF THE INVENTION

Figure 1:
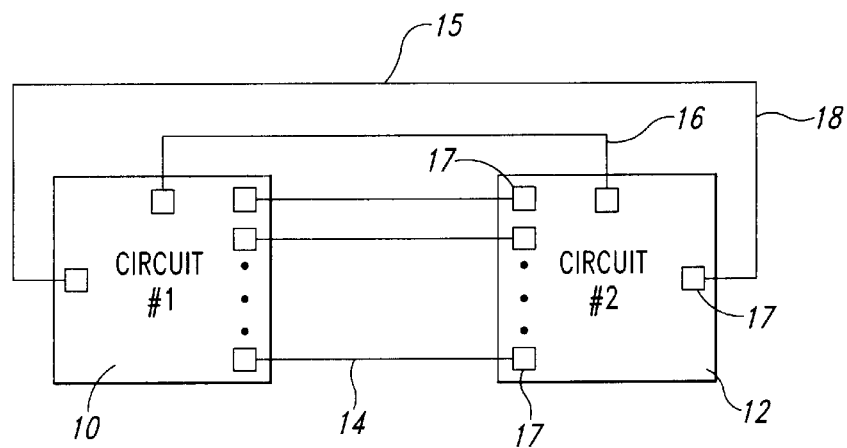
FIG. 1 is a block diagram of a first and second circuit according to principles of the present invention.

FIG. 1 shows a sending circuit 10 and a receiving circuit 12. Between the sending circuit 10 and the receiving circuit 12 are a number of transmission lines 15 including relatively short transmission lines 14, intermediate length transmission lines 16, and long transmission lines 18. Each transmission line is connected at a terminal 17 on the receiving circuit 12.

The circuits 10 and 12 can be any circuits in an electronic component. In one embodiment, the circuits 10 and 12 are both on the same integrated semiconductor chip. The transmission lines 15 are formed on the integrated circuit and constitute conductive patterns for carrying the data from one circuit in the chip to another circuit in the same chip. For example, they may be transmitting data from a memory array to an arithmetic logic unit or to different registries on the same chip. In another embodiment, the circuits 10 and 12 are each separate integrated circuits that are positioned on a printed circuit board relative to each other. The transmission lines 15 are mounted on the printed circuit board and metal lines on the board provide the interconnection between two separate integrated chips. In yet a third embodiment, the circuits 10 and 12 may be two different printed circuit boards spaced from each other within the computer. The transmission lines 15 are in data buses connecting the two boards to each other. The connection may be between one chip on one board and a second chip on another board or, alternatively, between a number of chips on one board and one or more chips on the second board.

Figure 2:
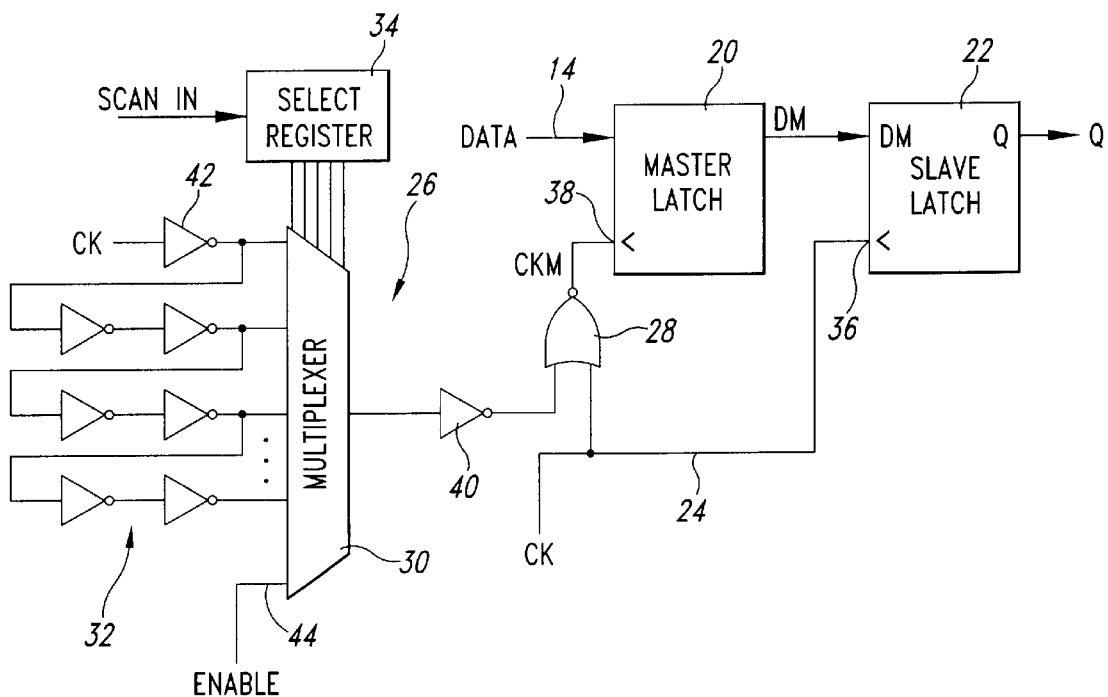
FIG. 2 is a block diagram of a selectable delay circuit according to principles of the invention.

FIG. 2 shows a circuit having a master latch 20, a slave latch 22, and a clock line 24 which provides a clocking input to both the master latch 20 and the slave latch 22. The circuit also includes a variable delay circuit 26. The variable delay circuit includes a NOR gate 28, a multiplexer 30, a software code select register 32, and a number of selectable delay elements 32 connected for input to the multiplexer 30.

The latches 20 and 22 are the type of latch in which data is passed immediately from the input to the output when the clock is high and when the clock is low, the data at the output does not change and remains the same, even if the data at the input may change. Thus, data provided to the master latch 20 when the clock is high, is immediately passed to the output with no delay, other than the minimum possible delay by propagation through the latch. Since the latches are extremely fast, the data will arrive virtually without delay at the output Q. On the other hand, if the clock is low, the output data value is held constant and cannot change. If new data is presented at the input of the master latch 20, the new data value will remain at the input and will not be transferred to the output. When the clock transitions from low to high, the value on the input of the latch 20 will be transferred to the output of the latch Q on the rising edge of the clock applied to clock terminal 30. The operation of the slave latch 22 is the same with respect to the data input and clock signal applied to the clock terminal 32.

The clock signal CK is the main system clock. This is the system clock that provides the synchronization for the transmission of data from circuit 10 to circuit 12 as shown in FIG. 1. It is provided to circuits 10 and 12 as the system clock, not shown in the block diagram of FIG. 1 for simplicity, but provided in a manner known in the art. This system clock is provided on line 24 to the slave latch clock terminal 36. It is also provided to one input of NOR gate 28. The output of NOR gate 28, CKM, is the clock for the master latch and is provided at the clock terminal 30 of the master latch 20. The other input terminal of NOR gate 28 is connected to the multiplexer 30 via inverter 40. When both inputs to the NOR gate 28 are low CKM for the master latch 20 will be high and if either of the inputs is high the output CKM will be low.

The system clock CK is also provided to the inputs of multiplexer 30 with various delay elements between each input. A first CK input to multiplexer 30 includes a single delay element 42, a second input includes three delay elements 42, a third input includes five delay elements 42, and so on, with as many delay elements 42 as desired for that particular circuit. The delay element 42 in one embodiment is a simple inverter. Of course, the delay element 42 can be any other acceptable circuit having a known propagation time to provide the desired delay. It can include, for example, a latch which is always enabled so that the input is provided to the output with the propagation delay of the latch, shift register type element, or any other appropriate delay element known in the art.

One of the inputs to multiplexer 30 includes an enable line 44. The enable line 44 is active at all times. In the present embodiment, enable line 44 is always tied high, although in a circuit which has enable low it can, of course, always be tied low.

One of the inputs of the multiplexer 30 is selected as the output for providing to inverter 40 under control from select register 34. The selection of a particular input to be provided as the output is determined by selection pins into the multiplexer 30 from select register 34. The data signal output from select register 34 will enable one of the input pins to be provided as the output and block the other inputs. Since each of the inputs has a different delay, the input having the desired delay is selected for providing as the output.

Select register 34 is a memory which stores the selection code for the multiplexer 30. The selection code is provided on a scan-in line under software control. When power is first provided to the circuits, including circuits 10 and 12, the appropriate enable and power-up codes are provided throughout the circuits. These codes include the software data which is loaded into the select register 34. In an alternative embodiment, the data in select register 34 is programmed in nonchangeable memory, such as ROM, after the circuits have been tested and the appropriate delay confirmed. In a further alternative embodiment, the codes within the select register 34 are changed at any time during operation of the circuits by providing a new software code from a program. Such a software code can enable any output from the multiplexer and thus provide different delays under software control. This can be done for test purposes, to improve data synchronization performance, or other reasons for better control during system operation. Use of a software code for loading the select register 34 provides the advantage that the amount of delay can be easily changed at any time during the life of the circuit or even during circuit operation. In the event the transmission properties of the signal lines change with respect to each other whether based on aging, connection of different lines to different terminals 17, the type of signal propagating thereon, the speed at which a signal is propagating, or other factors, the user retains the ability to program the delay as desired throughout the life of the circuit.

Figure 3:
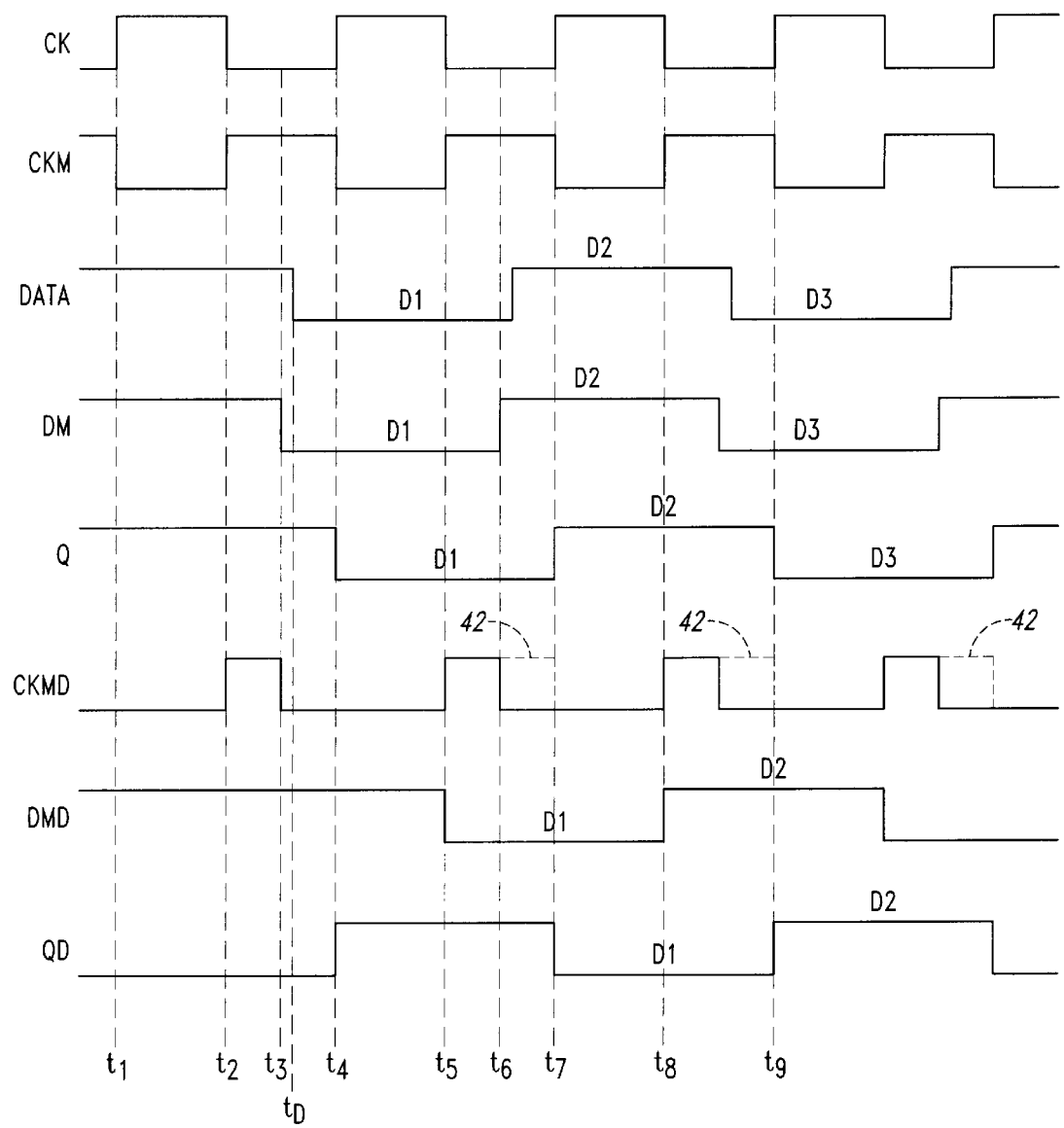
FIG. 3 is a diagram of various nodes in the circuit of FIG. 2 showing how a variable delay synchronized the data to the same clock pulse.

FIG. 3 is a timing diagram of various nodes in the circuit of FIG. 2 under different delay conditions to illustrate the operation of the invention. In the first example, the operation of the circuit will be described with no delay in the clock cycle for the data transmission to be received at circuit 12.

A second example will then be given showing how the timing of data received by circuit 12 can be delayed according to principles of the present invention.

The signal CK, CKM, data DM and Q represent the signals at the same labeled locations in FIG. 2. The system clock CK at a first frequency has rising edges $t_1$, $t_4$, $t_7$, etc. In a first example, the clock CKM for the master latch output from the NOR gate 28 is an exact inversion of the system clock CK. At time $t_2$ CKM has a rising edge while CK has a falling edge, and at time $t_4$ CK has a rising edge while CKM has a falling edge. There may be some slight delay between CK and CKM based on the propagation delay time of NOR gate 28, however this delay will be very small for purposes of the present invention.

In this first example, the always active input 44 of multiplexer 30 is selected for the output of the multiplexer 30 so that the input to the NOR gate 28 from inverter 40 is at a low signal. This results in no delay. The clock CK therefore controls the output CKM of NOR gate 28 so it acts as an inverter. Data is transmitted along a transmission line 15 from the circuit 10 under timing control of system clock CK to the receiving circuit 12 arriving at time $t_D$. It may travel along transmission line 14, 16 or 18. The exact timing for receipt of the data signal D1 relative to the clock CK is not known and is based on properties of the transmission line sent, such as the length of the line of other factors as discussed herein. In this example, the data pulse D1 arrives at a time $t_D$ with respect to the system clock CK being low and CKM being high. At the time of arrival, CKM is high so the data signal is passed immediately to the output DM and DM will track the data input. The signal on DM is provided to the input of slave latch 22. At a later time $t_4$ the system clock CK transitions high to enable the slave latch 22. The data D1 is then passed to the output Q on the next rising edge of the clock pulse after being received. The next data packet D2 is passed to the output Q at time $t_7$, which is the next rising clock pulse of the system clock after the data was received at the second circuit 12. The process continues, with the data being provided at the output Q on the next subsequent clock cycle after receipt.

An example will now be given in which the timing at output Q is shifted by one clock cycle. According to principles of the present invention, this is accomplished by shortening the enable time of the clock CKM to the master latch. Namely, the back portion of the enable signal to the master latch is cut off and brought low at a time prior to when it would normally fall low as a direct inversion of the system clock signal CK. The amount of time that the falling edge is advanced to fall low ahead of the normal clock signal CKM is determined by the amount of the delay introduced by delay elements 42. Introducing only one or very few delay elements 42 will advance the falling edge of the clock pulse a small amount. Introducing more delay elements 42 will advance the falling edge of the clock pulse an even greater amount so that the clock edge falls at a sooner time. The dashed line 44 in the delayed clock pulse CKMD indicates the amount of time that the falling edge is advanced so that it falls a selected amount of time sooner than it would otherwise fall. This creates a shorter enable time for the master clock CKM. The rise time is the same as before for the leading edge, however, the falling edge falls at a time sooner than it would otherwise fall, thus shortening the window when the master latch 20 is enabled.

The amount of the variable delay 44 will be selected based on the length of the transmission lines 14, 16 and 18 with respect to each other as well as other factors such as data transmission properties as discussed herein.

The operation of the circuit with the advanced falling edge time will now be described to provide an understanding of how this permits a clock cycle programmable delay of the data signal. The system clock CK is not affected by the change. The rising edges occur at the same time in this example at times $t_1$, $t_4$, $t_7$, etc. Similarly, the rising edge of the clock CKM is not affected so that the delayed signal CKMD has a rising edge at the same time, times $t_2$, $t_5$, $t_8$, etc. The data once again arrives at a time $t_D$. The falling edge of the clock CKMD occurs at time $t_3$, which is before the time $t_D$. The amount of advance 42 of the falling edge of the delayed clock CKMD is selected to occur before the data arrival time $t_D$. Accordingly, when the data pulse D1 arrives, the master latch 20 has been disabled and the data remains at the input but is not transmitted to the output. The output of the master latch under the delayed system, DMD, remains the same and does not change to follow the new data D1. Thus, as can be seen from line DMD, the output of the latch 20 under the delayed condition remains the same. At some subsequent time, $t_4$, clock CK goes high to enable slave latch 22. Since the data provided from the master latch has not changed, the data present at the slave latch 22 is delayed data, DMD, and thus the output Q is delayed to be QD, the data which was previously present at the master latch instead of the new data. At the next clock pulse $t_5$, CKMD transitions high simultaneously with CK transitioning low. When CKMD transitions high the data D1 is still present at the input and is immediately provided to the output as data D1 on line DM as shown in signal DMD. The data D1 is therefore held at the output of the master latch 20 on the input of the slave latch 22. At a subsequent time $t_6$ the clock to the master latch falls since the timing has been advanced as shown in signal CKMD. The subsequent data pulse D2 has not yet arrived, therefore the master latch 20 has been disabled before the arrival of this data pulse. At a subsequent time $t_7$ there is a rising edge of the system clock CK on line 24 to enable slave latch 22. Since the data D1 is now present, delayed, on line DM, this data is provided at the output as QD, namely Q delayed. The delayed data D1 is therefore provided at the output on the rising edge of the one next subsequent clock pulse from the system clock. During this same timeframe, the new data D2 has been provided to the master latch 20. At a subsequent time $t_8$ the master latch is enabled by signal CKMD and the data D2 is transmitted to the line DM under delayed form, DMD. On the next subsequent rising edge of the system clock at time $t_9$, the data D2 is provided at the output Q as delayed data, shown by signal QD. In a similar manner, all subsequent data will be shifted one clock cycle from the system clock before it is provided as the output Q.

As can be seen from this example, the output of the actual data at Q has been delayed by exactly one full cycle of the system clock. The data is still synchronized perfectly with CK, but delayed. Rather than being provided on the subsequent clock pulse after receipt by the receiving circuit 12, it is delayed one full clock cycle.

In one embodiment, all transmission lines 15 are approximately the same length. Assume, for example, that only lines 14 are between the circuits on a bus and lines 16 and 18 are not present. In this embodiment, a single delay circuit 26 is provided for all terminals. The clock for master latch CKM is provided to each terminal 17 from a single circuit 26 and the signal is input the respective master latch 20 at each pin. This provides considerable space savings and permits the delay on all lines 15 to move together, whether backward or not.

In another embodiment, the delay circuit of FIG. 2 is provided on each individual input terminal 17 of the receiving circuit 12. The amount of delay provided by each delay circuit is individually programmable input terminal 17. For some transmission lines, such as 18 which are extremely long, the programmed delay may be zero since the line has delay already. For other transmission lines, such as 14 or 16 depending on their respective lengths relative to line 18, a clock cycle delay may be introduced so as to match the arrival of data on transmission line 18. The advance in timing for the data signal can be custom selected for each input terminal 17 to ensure that exactly one clock cycle delay at all terminals even though the data will be arriving at a different time $t_D$ at each of the terminals.

The amount of advance for the falling edge of the master clock CKM can be determined on an individual custom basis for each clock speed or for each transmission line as needed. In a first embodiment, the characteristics of the transmission line are determined and the delay programmed in the initial manufacture of the circuit components. In a further embodiment, the circuit components can be tested under various conditions and different clock speeds and the amount of delay changed under the control of the software program depending on variations in clock speed or changes in other operating conditions. Some receiving terminals 17 which may have a one clock delay pulse under some circumstances, and may have no delay under other circumstances. The output of the data from the receiving terminal 17 to the circuit 12 is timed with respect to each of the transmission lines so that on the same clock pulse the data is provided from each of the terminals to the receiving circuit 12 in a transparent manner. The invention also provides the additional advantage that the actual transmission line connections can be changed during a redesign of the relationship between the two circuits if desired. For example, if a new transmission line is added or, if the connection from one transmission line is changed to a different input terminal 17 so as to change the length of the line, this can be done at any time during the testing of the circuit or during the life of the circuit. After the transmission line has been connected to the new desired location, the delay is set in the receiving circuit within the terminal 17 so as to be appropriate for the new connection. Therefore, during manufacture of the circuit the transmission lines can be connected as desired. Their lengths may vary slightly between each other and may also vary from one circuit to the next and yet reliable operation can be ensured because the delay is software programmable under individual control for each transmission line. Significant board and chip space is saved. Also, the circuit design does not need to be overly concerned about the exact length of the lines during the design. The timing at the receiving circuit can be fine tuned by software after the circuits are assembled and after test.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A circuit comprising:
    a sending circuit;
    a receiving circuit connected to the sending circuit;
    a communication line between the sending circuit and the receiving circuit;
    a master latch in the communication line, the timing of the master latch output being controlled by a first clock signal;
    a slave latch in the communication line, the timing of the slave latch output being controlled by a second clock signal;
    a variable delay circuit for controlling the first and second clock signal relative to each other to selectively vary the relationship between the first clock signal and the second clock signal, the variable delay circuit receiving the second clock signal and outputting a delay control signal; and
    a logic function circuit coupled for receiving the delay control signal and the second clock signal and for outputting the first clock signal to control the timing of the master latch output.

2. The circuit according to claim 1 wherein the variable delay circuit selectively varies the delay of the first clock signal and further including:
    a plurality of delay elements connectable in series with the first clock signal and the number of delay elements coupled in series is selectable.

3. The circuit according to claim 1 wherein the variable delay circuit is coupled to the master latch via the logic function circuit.

4. The circuit according to claim 1, further including:
    a plurality of communication lines between the sending circuit and the receiving circuit;
    a master latch coupled to each communication line; and
    a slave latch coupled to each communication line.

5. The circuit according to claim 4 wherein a single variable delay circuit is coupled to a plurality of master latches for controlling relative timing between the master latches and the respective slave latches together.

6. The circuit according to claim 4 wherein a plurality of variable delay circuits are provided, each connected to a respective master latch for individually controlling the timing delay of each master latch and slave latch combination relative to other master latches and slave latches.

7. The circuit according to claim 1 wherein the logic function circuit includes an OR function.

8. The circuit according to claim 7 wherein the logic function circuit is a NOR function circuit having the first clock signal as one input and the second clock signal as the other input, the first clock signal being delayed relative to the second clock signal by the variable delay circuit.

9. A circuit comprising:
    a first circuit for receiving a data signal;
    a second circuit connected to the first circuit by a communication lines to receive the data signal from the first circuit;
    a system clock coupled the second circuit;
    a variable delay circuit coupled to the system cock and to the first circuit for selecting a relative delay between a signal on the communication line and the system clock;
    a logic function circuit having a first input and a second input and an output, the first input being coupled to the output of the variable delay circuit, the system clock being coupled to the second input of the logic function circuit and the output of the logic function circuit being coupled to the input of the first circuit to control the timing of the data signal from the first to the second circuit based on a logical combination of both the system clock and the output of the variable delay circuit.

10. The system according to claim 9 wherein the system clock is provided at a first frequency on the first communication line and the variable delay circuit is selected to provide no delay and when the system clock is at a second frequency the delay is selected to create a one clock cycle delay in the signal on the communication line.

11. The circuit according to claim 9 wherein the communication line is between the first circuit and the second circuit.

12. The circuit according to claim 11 wherein the communication line is a bus having a plurality of individual transmission lines that have approximately the same length relative to each other.

13. The circuit according to claim 11 wherein the communication line is a bus having a plurality of individual transmission lines, each having a different length, relative to each other within the plurality of transmission lines.

14. The circuit according to claim 12 wherein a single variable delay circuit is provided for each transmission line in the bus.

15. The circuit according to claim 13 wherein a plurality of variable delay circuits are provided, one for each respective transmission line having a different length from each other.

16. The circuit according to claim 9, further including a master latch coupled in the communication line, the timing of the master latch being controlled by a first clock signal; and a slave latch coupled in the communication line, the timing of the slave latch controlled by a second clock signal.

17. The circuit according to claim 16 wherein the output of the variable delay circuit is coupled to the master latch for controlling the timing of the master latch.

* * * * *

UNITED STATES PATENT AND TRADEMARK OFFICE
CERTIFICATE OF CORRECTION

PATENT NO. : 6,629,250 B2
DATED : September 30, 2003
INVENTOR(S) : Andrew S. Kopser and Burton J. Smith It is certified that error appears in the above-identified patent and that said Letters Patent is hereby corrected as shown below:

Column 8,
Line 48, "lines" should read as -- line --.

Signed and Sealed this

Eighteenth Day of May, 2004

JON W. DUDAS
*Acting Director of the United States Patent and Trademark Office*